(12) United States Patent
Puzey (10) Patent No.: US 6,850,678 B2
(45) Date of Patent: Feb. 1, 2005

(54) REDUCED FOUR-WAVE MIXING OPTICAL FIBER FOR WAVELENGTH-DIVISION MULTIPLEXING

(75) Inventor: Kenneth A. Puzey, Essex Junction, VT (US)

(73) Assignee: Teracomm Research, Inc., Essex Junction, VT (US)

( * ) Notice: Subject to any disclaimer, the term of this patent is extended or adjusted under 35 U.S.C. 154(b) by 0 days.

(21) Appl. No.: 10/808,916

(22) Filed: Mar. 24, 2004

(65) Prior Publication Data

US 2004/0175083 A1 Sep. 9, 2004

Related U.S. Application Data

(63) Continuation of application No. 09/837,282, filed on Apr. 19, 2001, now Pat. No. 6,738,548.

(51) Int. Cl.$^7$ .............................. G02B 6/02; G02B 6/16; H04B 10/12
(52) U.S. Cl. ...................... 385/123; 385/122; 359/341.1
(58) Field of Search ................................. 385/122–123; 359/341.1

(56) References Cited

U.S. PATENT DOCUMENTS

| | | | |
|---|---|---|---|
| 5,010,311 A | 4/1991 | Hed | |
| 5,155,093 A | 10/1992 | Den et al. | |
| 5,600,172 A | 2/1997 | McDevitt et al. | |
| 5,677,786 A | 10/1997 | Meli | |
| 5,768,002 A | 6/1998 | Puzey | |
| 5,856,881 A | 1/1999 | Otsuka et al. | |
| 5,894,537 A | 4/1999 | Berkey et al. | |
| 6,115,170 A | 9/2000 | Puzey | |
| 6,437,906 B1 | 8/2002 | Di Pasquale et al. | |

OTHER PUBLICATIONS

James J. Refi, Optical Fibers for Optical Networking, Jan.–Mar. 1999, Bell Labs Technical Journal, p246–261.

Kevin M. Able, Optical–Fiber Designs Evolve, Feb. 1998, Lightwave.

Le Nguyen Binh and Su–Vun Chung, Generalized Approach to Single–Mode Dispersion–Modified Optical Fiber Design, Aug. 1996, Optical Engineer, V 35, N 8, p 2250–2261.

C. R. Hammond, Silica–Based Binary Glass Systems: Wavelength Dispersive Properties and Composition in Optical Fibres, Oct. 1978, Optical and Quantum Electronics, V 10, p163–170.

A. Tredicucci et al, High–Power Inter–Miniband Lasing in Intrinsic Superlattices, May 11, 1998, Applied Physics Letters, V 72, N 19, p2388–2390.

A. G. Aleksanyan et al, Semiconductor Laser Made of $Bi_{1-x}Sb_x$, Mar. 1984, Sov. J. Quantum Electron, V 14, N 3, p 336–338.

(List continued on next page.)

Primary Examiner—Akm Enayet Ullah
Assistant Examiner—Jerry T Rahll
(74) Attorney, Agent, or Firm—Michael Pritzkau; Yoriko Morita (57) ABSTRACT

An optical fiber includes a core for guiding light of a specified range of wavelengths therethrough, each wavelength in the specified range of wavelengths traveling through the core at a particular group velocity and the light potentially producing a nonlinear optical effect. The optical fiber also includes a cladding formed around the core for substantially containing the light within the core. The optical fiber further includes a predetermined amount of at least one dopant uniformly dispersed throughout the core such that no two distinct wavelengths in the specified range of wavelengths travel through the core at the same, particular group velocity, thereby causing the nonlinear optical effect to be suppressed.

21 Claims, 5 Drawing Sheets

OTHER PUBLICATIONS

R. Sobolewski, Ultrafast Dynamics of Nonequilibrium Quasiparticles in High–Temperature Superconductors, 1998, Proc. SPIE. 3481, p 480–491.

R Sobolewski et al, Magneto–Optical Modulator for Super Conducting Digital Output Interface, Sep. 17, 2000, Applied Semiconductivity Conference, Virginia Beach VA.

C. Williams et al, Ultrafast YBCO Photodetector Based on the Kinetic–Inductive Process, Jun. 19, 2001, $8^{th}$ International Superconductive Electronics Conference, Osaka Japan.

G. Gol'tsman et al, Fabrication and Properties of an Ultrafast NbN Hot–Electron Single–Photon Detector, Sep. 17, 2000, Applied Semiconductivity Conference, Virginia Beach VA.

$P_2O_5$-doped core (20 mol%)

Photon Energy (eV)

GeO$_2$-doped core (20 mol%)
and B$_2$O$_3$-doped cladding (20 mol%)

Photon Energy (eV)

REDUCED FOUR-WAVE MIXING OPTICAL FIBER FOR WAVELENGTH-DIVISION MULTIPLEXING

This application is a continuation application of U.S. patent application Ser. No. 09/837,282 filed Apr. 19, 2001, now U.S. Pat. No. 6,738,548 the disclosure of which is incorporated herein by reference.

BACKGROUND OF THE INVENTION

The present invention relates generally to optical fibers and, more particularly, to optical fibers in which the occurrence of four-wave mixing is reduced.

The advent of wavelength-division multiplexing (WDM) in optical networking has increased the demands placed on optical fibers. Manufacturers are pressured to produce optical fibers that are capable of carrying optical signals on a wider range of wavelengths and over longer distances with less loss than can be accomplished with presently available optical fibers. Concurrent developments in optical sources for WDM have increased the amount of optical power and bit rates that must be transmitted through the optical fiber.

The demand for higher optical power throughput and wider range of transmitted wavelengths has led to an increase in the occurrence of error due to nonlinear optical effects produced during light propagation through the optical fiber. Four-wave mixing (FWM) is especially problematic in WDM networks because this nonlinear optical effect leads communication errors that cannot be easily removed by known solutions such as, for example, wavelength filtering equalization.[1]

As is well-known in the art, FWM is the induced combination of three wavelengths to produce one or more new lengths. Two of the three combining wavelengths can be degenerate such that FWM also includes the combination of two wavelengths to produce one or more new wavelengths. Optical power is taken away from the combining wavelengths and transferred to the new wavelengths in the FWM process. FWM is especially problematic in optical communications if the new wavelengths produced by the FWM process overlap the assigned wavelengths of existing WDM channels because it is difficult to distinguish between the legitimate optical data signals at these existing WDM channels and the error signal superimposed thereon as the result of FWM. Therefore, it is of particular concern to the practitioner of the art to suppress FWM.

Figure 1:
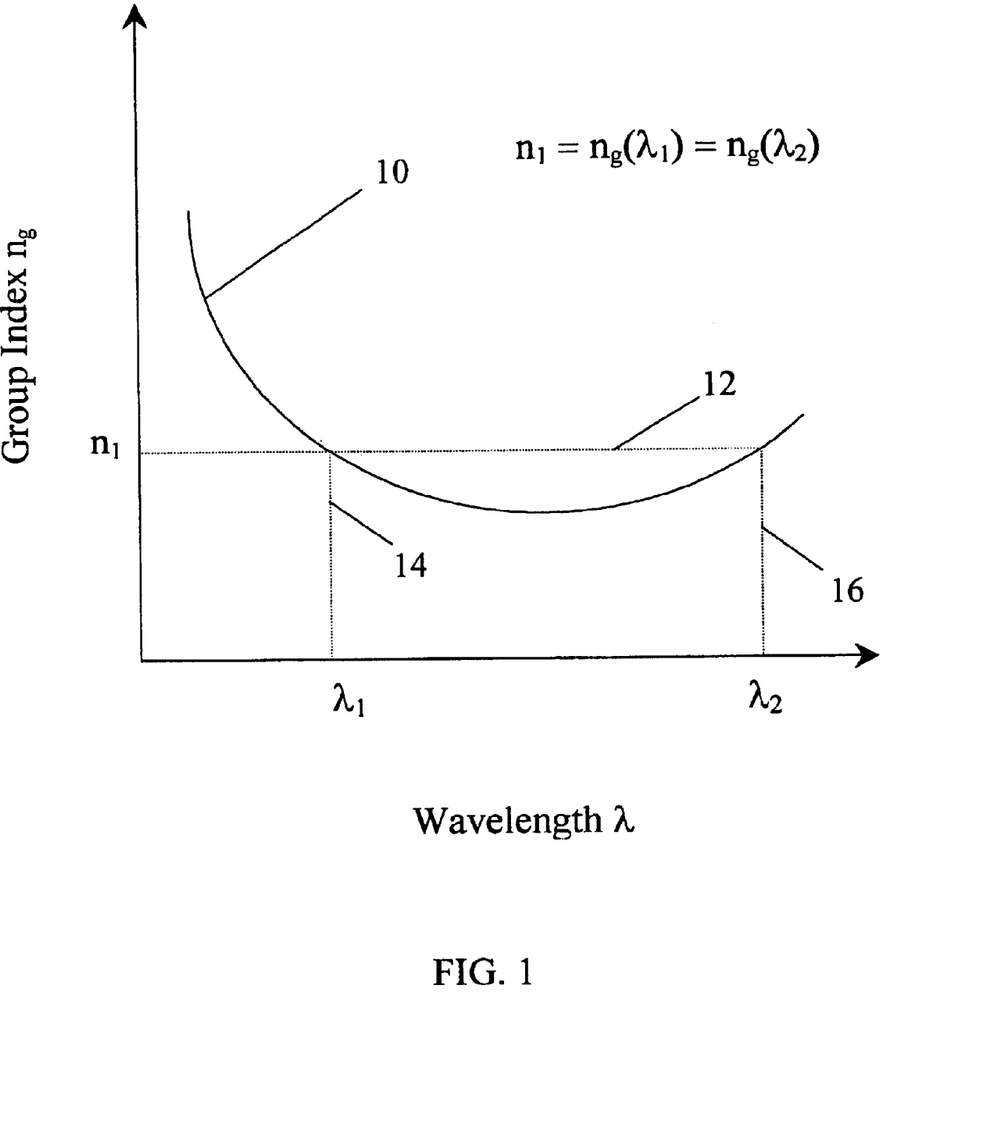
FIG. 1 is a graph illustrating the typical group index values as a function of wavelength for a conventional optical fiber, shown here to illustrate the existence of degenerate group index values for two different wavelengths.

It is also well-known that the efficiency of the FWM process increases when the potentially combining wavelengths travel along the optical fiber at the same group velocity over an extended distance. In other words, the longer the potentially combining wavelengths travel together down the optical fiber at the same group velocity, the higher the risk of communication error resulting from FWM. A typical group index profile, generally indicated by reference number 10, as a function of wavelength is shown in FIG. 1. As shown in FIG. 1, a conventional optical fiber typically exhibits a group index profile that is slightly parabolic in shape over the optical fiber communication wavelength range. As indicated by dotted lines 12, 14 and 16, there exist pairs of wavelengths, such as $\lambda_1$ and $\lambda_2$ shown in FIG. 1, that share the same group index values. In the example shown in FIG. 1, light signal of wavelength $\lambda_1$ and light signal of wavelength $\lambda_2$ traveling through the optical fiber will both "see" a group index value of $n_1=n_g(\lambda_1)=n_g(\lambda_2)$. Since the group velocity is related to the group index by the equation: $v_g=c/n_g$, the group velocity of a light signal of wavelength $\lambda_1$ is equal to the group velocity of a light signal of wavelength $\lambda_2$. In this way, in conventional optical fibers, the group velocities of the shorter wavelengths in the wavelength range are generally the same as the group velocities of the longer wavelengths in the wavelength range. As a result, the FWM efficiency for the combination of the shorter wavelengths and the longer wavelengths in the optical fiber communication wavelength range is high, therefore leading to a high probability of potential error introduced in the transmitted optical signals. In the example shown in FIG. 1, the FWM efficiency for the combination of $\lambda_1$ with $\lambda_2$ is high, therefore leading to a high probability of potential error occurring due to FWM.

Advances in chromatic dispersion shifting and reduction in optical fibers have actually exacerbated the problem because FWM efficiency increases around the wavelength at which chromatic dispersion is zero. Increased optical power at the potentially combining wavelengths also increases the FWM efficiency. Furthermore, increased variety of wavelengths used at the WDM channels also exacerbate the FWM problem because more optical wavelength combinations are available for the FWM process.

One known way to prevent the occurrence of FWM is to keep the optical power throughput low over the operating wavelength range of the WDM network. However, reduction of optical power leads to problems such as the cost associated with the need for additional repeaters to regenerate the optical signals and the potential increase in bit error rates due to signal weakness. The technological demand for increased distance between repeaters, reduced cost and more reliable data transmission makes this approach impractical.

Another approach to FWM suppression is to provide small but non-zero chromatic dispersion over the operating wavelength range. By introducing variation in the group velocities at different wavelengths in this way, FWM efficiency is reduced. This approach may be implemented using specialty optical fibers known in the art such as, for example, non-zero dispersion fiber (NZDF) and non-zero dispersion-shifted fiber (NZ-DSF). A dispersion compensation fiber (DCF) may also be used in this approach. Also known as a negative dispersion fiber, DCF is generally an optical fiber whose chromatic dispersion decreases with increased wavelength (negative dispersion), as opposed to most other optical fibers whose chromatic dispersion increases at longer wavelengths (positive dispersion). By splicing predetermined lengths of DCF into an optical network that has been implemented using positive dispersion optical fiber, the overall chromatic dispersion profile of the network can be manipulated in such a way that a small but non-zero chromatic dispersion is present across the operating wavelength range thus suppressing FWM.

There exist commercially-available optical fibers which combine the two aforedescribed approaches to FWM suppression. The LEAF fiber (which is an abbreviation for Large Effective Area Fiber), available from Corning, provides a larger effective mode area, in comparison to most available NZ-DSF, through which the optical signals travel. [2] Thus, since the optical power is spread over a larger area of the optical fiber than in conventional fibers, more optical power can be directed down the optical fiber without inducing nonlinear effects such as FWM. In addition, the LEAF has the characteristics of NZ-DSF such that FWM efficiency is further reduced. The TrueWave XL fiber, manufactured by Lucent Technologies, also features a larger effective modal area as well as negative dispersion properties.

A problem common to the aforedescribed prior art approaches is the manufacturing complexity of the specialty optical fibers. Careful design and precision fabrication are required in order to achieve the often complex, radial refractive index profiles of these specialty fibers. The transmission characteristics of conventional optical fibers are established simply by the radius of the core and the relative values of the core refractive index and the cladding refractive index. However, the specialty optical fibers for FWM suppression require refractive index profiles that may vary linearly, parabolically, in steps or some combination thereof in the radial direction from the center of the fiber core. Some specialty fibers even require multiple cladding layers of different materials. The design and fabrication of these speciality fibers can be complicated and costly.[3]

The present invention provides an optical fiber which serves to resolve the problems described above with regard to prior art optical fibers in a heretofore unseen and highly advantageous way and which provides still further advantages.

SUMMARY OF THE INVENTION

As will be described in more detail hereinafter, there is disclosed herein an optical fiber including a core for guiding light of a specified range of wavelengths therethrough, each wavelength in the specified range of wavelengths traveling through the core at a particular group velocity and the light potentially producing a nonlinear optical effect. The optical fiber also includes a cladding formed around the core for substantially containing the light within the core. The optical fiber further includes a predetermined amount of at least one dopant uniformly dispersed throughout the core such that no two distinct wavelengths in the specified range of wavelengths travel through the core at the same, particular group velocity, thereby causing the nonlinear optical effect to be suppressed.

In another aspect of the invention, the core of the optical fiber includes a range of group index values uniformly distributed throughout the core, each wavelength in the specified range of wavelengths being associated with a particular group index value in the range of group index values and the light potentially producing a nonlinear optical effect. The optical fiber also includes an amount of at least one dopant uniformly dispersed throughout the core such that no two distinct wavelengths in the specified range of wavelengths are associated with the same, particular group index value in the range of group index values, thereby causing the nonlinear optical effect to be suppressed.

BRIEF DESCRIPTION OF THE DRAWINGS

The present invention may be understood by reference to the following detailed description taken in conjunction with the drawings briefly described below.

DETAILED DESCRIPTION

Figure 2A:
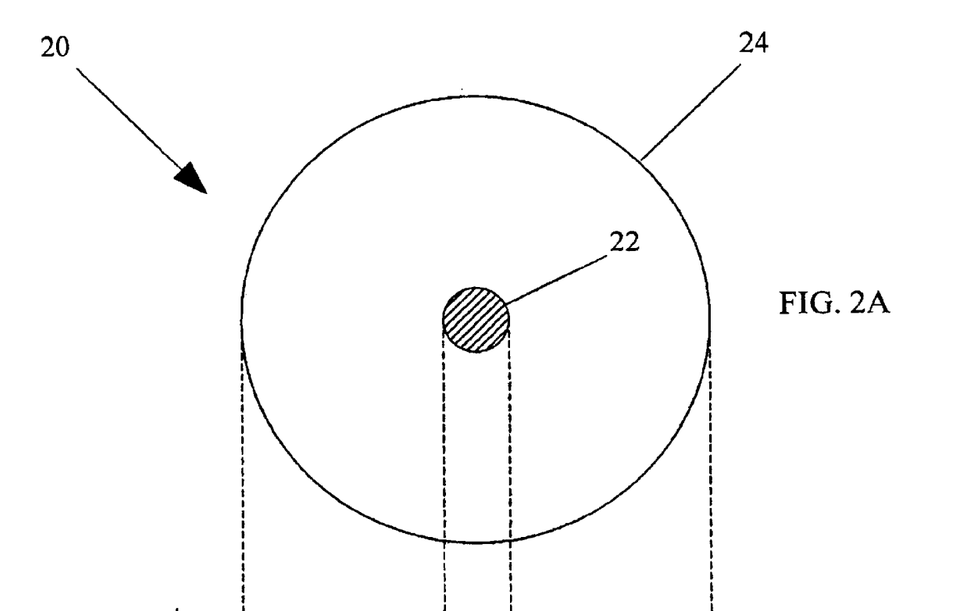
FIG. 2A is a cross-sectional view of one embodiment of an optical fiber manufactured in accordance with the present invention shown here to illustrate the internal structure of the optical fiber.

Turning again to the drawings, attention is immediately directed to FIG. 2A, which illustrates one embodiment of an optical fiber, generally indicated by the reference numeral 20. Optical fiber 20 includes a core 22 surrounded by a cladding 24. The dimensions of core 22 and cladding 24 are similar to those of a conventional single mode fiber, which commonly has a core diameter of 4 μm and a cladding diameter of 125 μm. Core 22 and cladding 24 are based on silica glass ($SiO_2$) or a similar material. Core 22 and cladding 24 are designed to have different values of refractive index such that light of a specified range of wavelengths is guided through the optical fiber.

Figure 2B:
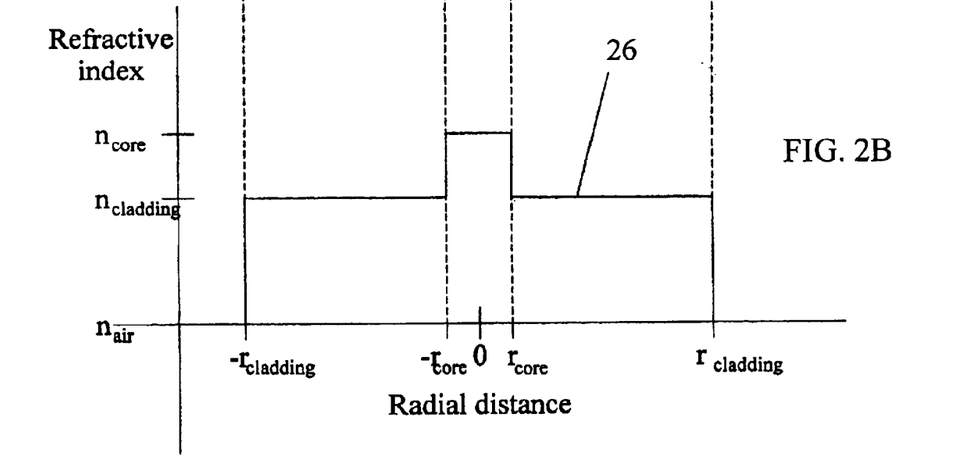
FIG. 2B is a graph illustrating the distribution of refractive index values across a diameter of the optical fiber shown in FIG. 2A.

The relative values of the refractive index of air, cladding and core are shown in FIG. 2B by line 26. As in the case of conventional single mode fiber, the refractive index value of the cladding ($n_{cladding}$) is relatively higher than that of air ($n_{air}$), and the core is composed of a material with a refractive index value ($n_{core}$) that is higher than $n_{cladding}$. It should be noted that the value of refractive index of a given material is dependent on the properties of the material as well as on the wavelength λ of light transmitted through that material. That is, each wavelength is associated with its own refractive index value such that refractive index value is a function of λ. Hence, line 26 of FIG. 2B represents the radial refractive index profile of optical fiber 20 for a particular wavelength of light. The difference in the values of refractive index between core 22 and cladding 24 is designed such that light of a specified range of wavelengths is guided along the core. For example, in WDM applications to date, it is desirable to be able to guide light of the wavelength range λ=1.29 μm to 1.60 μm through the optical fiber.

Figure 3:
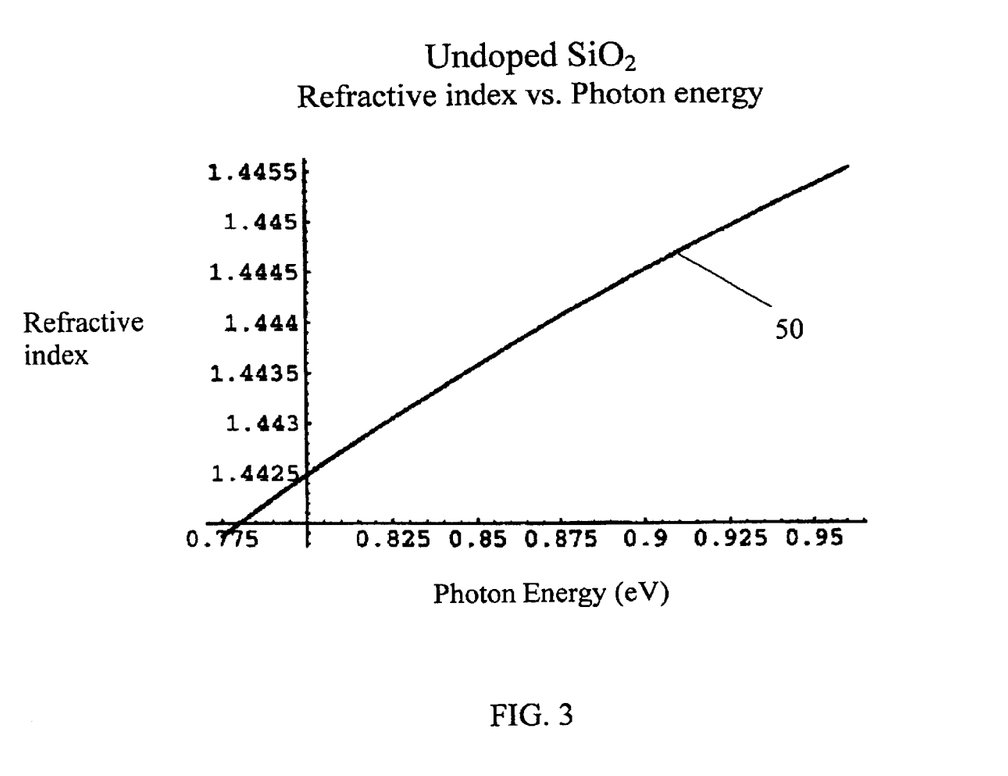
FIG. 3 is a graph illustrating the refractive index values as a function of photon energy for undoped silica.

By noting that 1 electron volt (eV) of photon energy corresponds to the energy of a photon of wavelength λ=1.24 μm, this wavelength range is equivalent to the photon energy range of $E_p$=0.775 eV to 0.961 eV. In this case, the refractive index value can be expressed as a function of $E_p$. A graph of the refractive index value versus photon energy for silica over the photon energy range of $E_p$=0.775 eV to 0.961 eV is shown in FIG. 3. The graph shown in FIG. 3 has been calculated using a two-term Sellmeier model as described in C. R. Hammond, "Silica-based binary glass systems: wavelength dispersive properties and composition in optical fibres," *Optical and Quantum Electronics*, vol. 10, 1978, pp. 163–170 (Hammond), which is herein incorporated by reference. The units of photon energy will be used in the discussion which follows hereinafter.

Continuing to refer to FIG. 3, curve 50, which corresponds to the refractive index value as a function of photon energy over the photon energy range of interest, is generated according to the two-term Sellmeier model as described in Hammond:

$$n(E_p)^2 - 1 = \frac{E_d E_o}{E_o^2 - E_p^2} + \frac{E'_d E'_o}{E'^2_o - E_p^2} \qquad \text{Eq. (1)}$$

where $E_d$ and $E_o$ are the dispersion energy and the effective oscillator energy in the visible and near-infrared wavelengths, respectively, and $E'_d$ and $E'_o$ are respectively the dispersion energy and the effective oscillator energy adjustment terms in the infrared wavelengths. The values of $E_d$, $E_o$, $E'_d$ and $E'_o$ as given in Table I of Hammond are used in generating curve 50.

In general, the group index which corresponds to the group velocity at which light of a given photon energy will travel through a material, is also dependent on the photon energy and properties of the material. The group index can be calculated from the refractive index value $n(E_p)$ using the expression:

$$n_{group}(E_p) = n(E_p) + E_p \cdot \frac{dn(E_p)}{d(E_p)} \qquad \text{Eq. (2)}$$

and the group velocity as a function of photon energy can then be expressed as:

$$v_{group}(E_p) = \frac{c}{n_{group}(E_p)}. \qquad \text{Eq. (3)}$$

As previously observed, the occurrence of FWM increases when the potentially combining wavelengths travel along the fiber at the same group velocity over an extended distance. Furthermore, it is also noted that the group velocity is dependent on the group index $n_{group}(E_p)$ which is in turn dependent on the properties of the material through which the light is traveling. Therefore, by adjusting the material properties of core 22 and/or cladding 24, it is possible to achieve a group index profile in which no two photon energies (or wavelengths) are associated with the same group index, and hence group velocity, over the photon energy range of interest. In this way, the occurrence of FWM is reduced in optical fiber 20.

Returning to FIG. 2A, core 22 of optical fiber 20 includes at least one dopant (not shown) uniformly dispersed throughout the core. The dopant material may be commonly used dopants used in fabricating conventional optical fiber including, but not limited to, phosphorus oxide ($P_2O_5$) and germania ($GeO_2$). The amount of dopant included in the core is determined so as to ensure that no two wavelengths in the specified range of wavelengths are associated with the same refractive index value. In addition, a cladding dopant may be dispersed throughout cladding 24 so as to further reduce the FWM efficiency. A material suitable for use as the cladding dopant includes, but is not limited to, boron oxide $B_2O_3$.

Figure 4A:
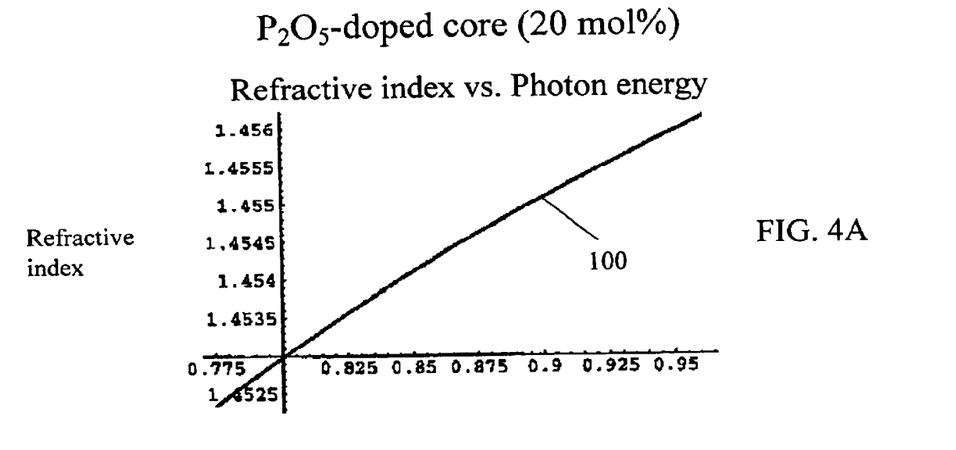
FIG. 4A is a graph illustrating the refractive index values as a function of photon energy for an optical fiber with a silica-based core that has been doped uniformly throughout with 20 mol % of $P_2O_5$.
Figure 4B:
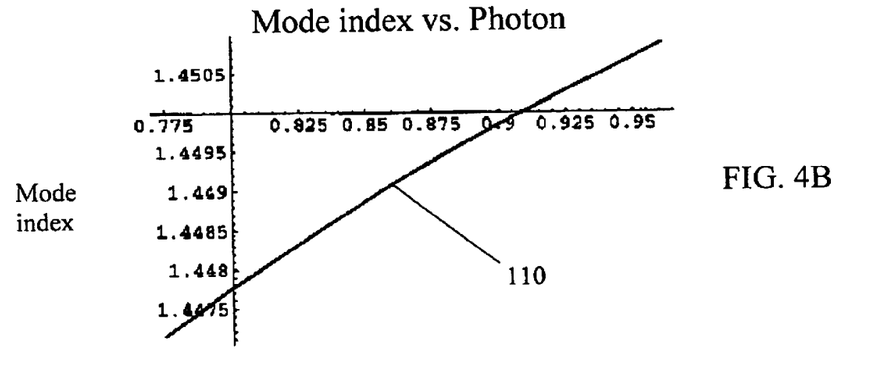
FIG. 4B is a graph illustrating the mode index values as a function of photon energy for an optical fiber with a silica-based core that has been doped uniformly throughout with 20 mol % of $P_2O_5$.
Figure 4C:
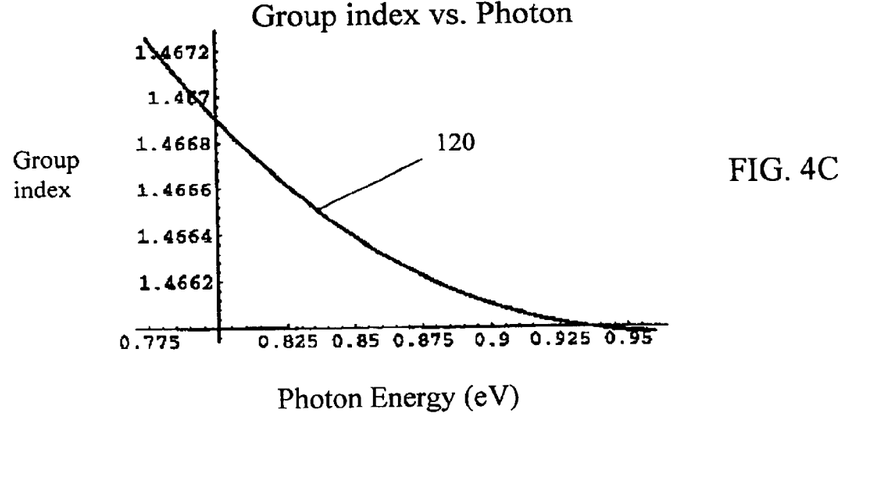
FIG. 4C is a graph illustrating the group index values as a function of photon energy for an optical fiber with a silica-based core that has been doped uniformly throughout with 20 mol % of $P_2O_5$.

Attention is now directed to FIGS. 4A–4C illustrating the refractive index, mode index and group index values as a function of photon energy for an optical fiber including a silica-based core doped with 20 mol % of $P_2O_5$ and a silica cladding according to the present invention. The graphs are generated using the abovementioned two-term Sellmeier model as shown in Eq. 1 with a doping level dependency introduced into the dispersion and oscillator energy terms $E_d$, $E_o$, $E'_d$ and $E'_o$ so as to take into account the material composition of the core and the cladding. The dispersion and oscillator terms for the core, in this case, are dependent on a variable x, which corresponds to the molecular ratio of silica to dopant (x $SiO_2$:1 $P_2O_5$, etc.). For example, x=4 for a material of a silica base doped with 20 of mol % $P_2O_5$. Then, the dispersion and oscillator energies are expressed as:

$$E_o(x) = E_o(\text{dopant}) + U(x)[E_o(\text{base}) - E_o(\text{dopant})] \qquad \text{Eq. (4a)}$$

and $$E_d(x) = E_d(\text{dopant}) + V(x)[E_d(\text{base}) - E_d(\text{dopant})] \qquad \text{Eq. (4b)}$$

where U(x) and V(x) are the bond fraction and cation fraction, respectively. U(x) and V(x) are determined according to the composition of the molecules with U(x)=V(x)=1 for $SiO_2$ and U(x)=V(x)=x/(x+2) with $P_2O_5$ as the dopant, according to Hammond. In this way, curve 100 corresponding to the refractive index value as a function photon energy as shown in FIG. 4A is generated by combining Eq. (1) with Eqs. (4a) and (4b).

Turning now to FIG. 4B, curve 110 represents calculated mode index values as a function of photon energy in the case where the optical fiber is composed of a $P_2O_5$-doped silica core with a diameter of 4 μm and a silica cladding. Mode index $n_{mode}(E_p)$ is a value which corresponds to the index of refraction as seen by an optical mode of a particular photon energy propagating through the core an optical fiber. Mode index differs from the refractive index or group index because mode index takes into account the finite diameter of the core as well as the difference in the refractive index values between the core and the cladding of the optical fiber. For a system in which a material with a particular refractive index value is surrounded by another material with a different refractive index value, the group index must be calculated from the mode index. The mode index is expressed as:

$$n_{mode}(E_p) = n_{cladding}(E_p) + \beta \cdot [n_{core}(E_p) - n_{cladding}(E_p)] \qquad \text{Eq. (5)}$$

where $\beta = [(1.1428 - 0.9960)/V]^2 \approx 0.004074$ to an accuracy of 0.2% using the approximation that the $V = ka(n_{core}^2 - n_{cladding}^2) = 2.3$, where k=wave number and a=core diameter=4 μm. In the present case of $P_2O_5$-doped silica core optical fiber with silica cladding, $n_{cladding}(E_p)$ is $n(E_p)$ as shown in FIG. 3, and $n_{core}(E_p)$ is the refractive index as a function of photon energy as shown in FIG. 4A. Mode index, as represented by curve 110 in FIG. 4B, becomes the basis from which the group index is calculated.

Referring now to FIG. 4C, curve 120 represents the group index value as a function of photon energy for the $P_2O_5$-doped silica core optical fiber with silica cladding. Curve 120 is generated using Eq. (2), replacing $n(E_p)$ with $n_{mode}(E_p)$. As can be seen in FIG. 4C, no two values of photon energy are associated with the same value of group index. Therefore, by doping the core of a silica-based optical fiber with 20 mol % of $P_2O_5$, as in the case shown in FIG. 4C, it is ensured that no two photon energies (or wavelengths) of light travel through the optical fiber at the same group velocity and thus FWM is reduced.

The procedure used to generate FIGS. 4A–4C can be used to calculate the amount of dopant required to achieve the desired FWM-reduction effect. Different amounts of dopant, different dopant materials and combinations of dopants can be inserted into Eqs. (1)–(5) to determine if another molecular concentration or a different dopant may be used to accomplish the effect of tailoring the group index curve so that no two photon energies of light travel at the same group velocity through the optical fiber. In this way, combinations of core and cladding dopants and their concentrations for achieving non-degenerate group index values over the photon energy range of interest are calculated.

It should be emphasized that the optical fiber with the refractive, mode and group index curves as shown in FIGS. 4A–4C has a simple, radial refractive index profile as shown in FIG. 2B. The dimensions of this optical fiber fabricated according to the present invention are similar to those of conventional single mode optical fiber with a difference in that the doping levels of the core has been tailored to yield a group index curve as shown in FIG. 4C. Therefore, the manufacturability of the optical fiber fabricated according to the present invention is improved with respect to that of the more complex, prior art specialty optical fibers such as NZ-DSF and DCF because uniform doping levels are used throughout the core and the cladding in the present invention instead of varying the doping level to achieve ramped or curved refractive index profiles. The optical fiber of the present invention can be fabricated using essentially the same manufacturing procedures as conventional optical fiber (with a difference in that a predetermined, uniform level of one or more dopants is dispersed throughout the core) while reducing the occurrence of FWM.

Figure 5A:
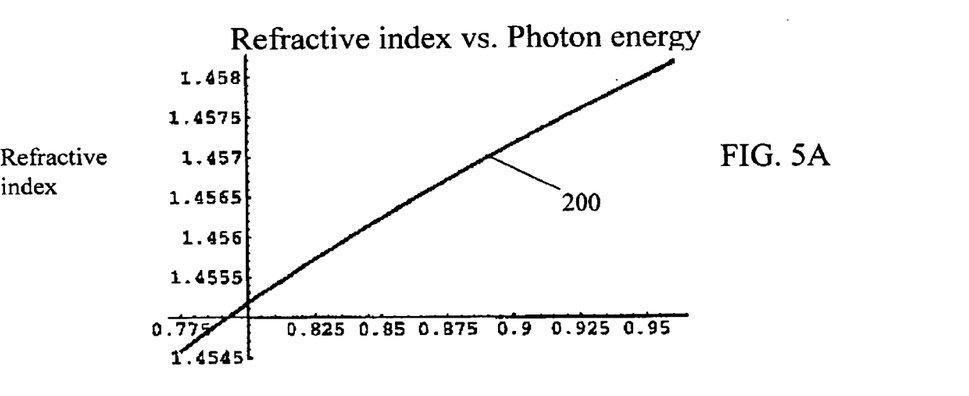
FIG. 5A is a graph illustrating the refractive index values as a function of photon energy for an optical fiber with a silica-based core that has been doped uniformly throughout with 20 mol % of $GeO_2$ and a silica-based cladding that has been doped uniformly throughout with 20 mol % of $B_2O_3$.
Figure 5B:
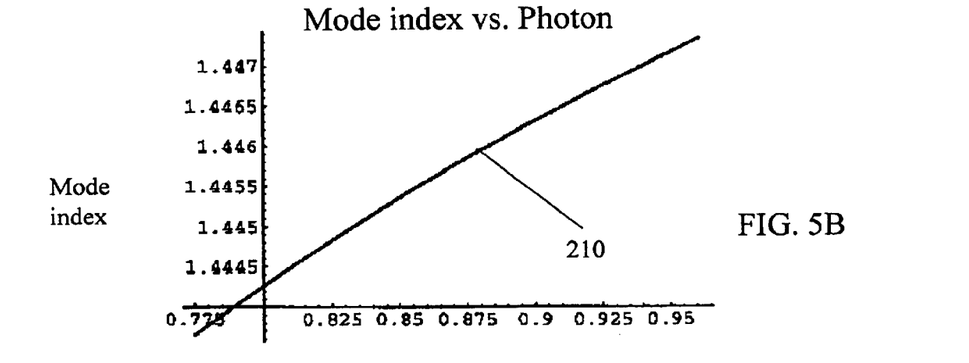
FIG. 5B is a graph illustrating the mode index values as a function of photon energy for an optical fiber with a silica-based core that has been doped uniformly throughout with 20 mol % of $GeO_2$ and a silica-based cladding that has been doped uniformly throughout with 20 mol % of $B_2O_3$.
Figure 5C:
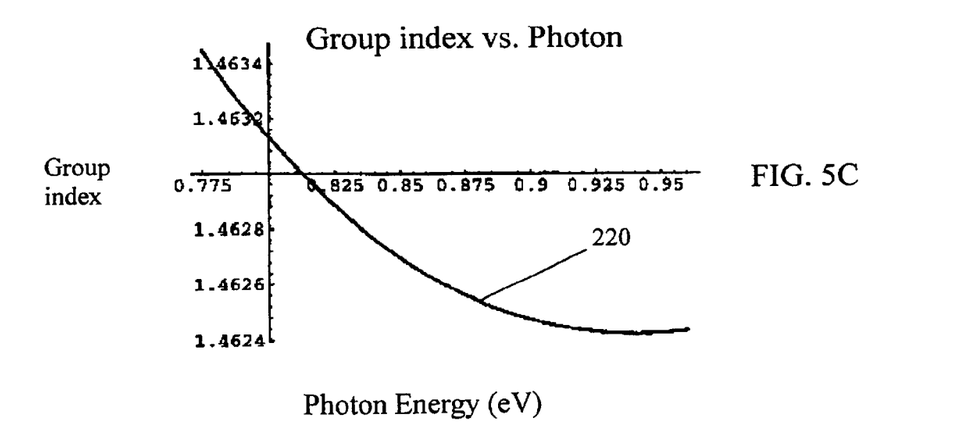
FIG. 5C is a graph illustrating the group index values as a function of photon energy for an optical fiber with a silica-based core that has been doped uniformly throughout with 20 mol % of $GeO_2$ and a silica-based cladding that has been doped uniformly throughout with 20 mol % of $B_2O_3$.

The refractive index, mode index and group index values as a function of photon energy of another optical fiber manufactured in accordance with the present invention are illustrated in FIGS. 5A–5C. The optical fiber with the index curves as shown in FIGS. 5A–5C includes a silica-based core doped with 20 mol % of $GeO_2$ and a silica-based cladding doped with 20 mol % of $B_2O_3$. Although the specific refractive and mode index values shown in FIGS. 5A and 5B are different from those shown in FIGS. 4A and 4B, respectively, the shapes of curves 200 and 210 are similar to curves 100 and 110, respectively. In comparing FIG. 5C to FIG. 4C, however, it is noted that curve 220 of FIG. 5C, corresponding to the group index values versus photon energy in the case of the $GeO_2$-doped core and $B_2O_3$-doped cladding combination, has a slightly more parabolic shape at the higher photon energies than curve 120 shown in FIG. 4C. Therefore, the condition of having non-degenerate group index values over the range of photon energies is maintained only for photon energies less than approximately 0.925 eV, by inspection, for the $GeO_2$-doped core and $B_2O_3$-doped cladding combination. Hence, this particular combination of dopants in the core and cladding will result in a fiber which is effective in reducing FWM only over the range of approximately $\lambda=1.34$ to 1.60 $\mu$m. However, the advantages of the simple, radial refractive index profile and hence the simplified manufacturing process of the optical fiber as characterized in FIGS. 4A–4C are maintained in the optical fiber whose index properties are illustrated in FIGS. 5A–5C.

Although only two specific examples of the present invention have been described, since the optical fiber and associated method disclosed herein may be provided in a variety of different configurations and the method may be practiced in a variety of different ways, it should be understood that the present invention may be embodied in many other specific ways without departing from the spirit or scope of the invention. For example, the core and cladding of an optical fiber may be doped in essentially unlimited number of ways using a variety of different dopants in a way which yields an optical fiber with a group index curve such that no two photon energies of light correspond to the same group index (thus travel with the same group velocity) in the optical fiber. Such modifications are considered to be within the scope of the present invention so long as the teachings herein are applied. Therefore, the present examples are to be considered as illustrative and not restrictive, and the invention is not to be limited to the details given herein, but may be modified within the scope of the appended claims.

References

[1] Refi, James J., "Optical Fibers for Optical Networking," *Bell Labs Technical Journal*, January–March 1999, pp. 246–261.

[2] Able, Kevin M., "Optical-fiber designs evolve," *Lightwave Special Report* (www.light-wave.com), February 1998

[3] Binh, Le Nguyen and Chung, Su-Vun, "Generalized approach to single-mode dispersion-modified optical fiber design," *Optical Engineering*, vol. 35, no. 8, August 1996, pp. 2250–2261.

[4] Hammond, C. R., "Silica-based binary glass systems: wavelength dispersive properties and composition in optical fibres," *Optical and Quantum Electronics*, vol. 10, 1978, pp. 163–170.

What is claimed is:

1. An optical fiber comprising:
   a core for guiding light of a specified range of wavelengths therethrough, said light traveling through said optical fiber with a given power and potentially producing a nonlinear optical effect at said given power;
   a cladding formed around the core for substantially containing the light within the core, said core and cladding being configured such that using only said core and said cladding in said optical fiber provides a first probability of said light producing said nonlinear optical effect at said given power; and
   a predetermined amount of at least one dopant uniformly dispersed throughout the core such that, with said dopant, said optical fiber provides a second probability of said light producing said nonlinear optical effect at said given power, wherein said second probability is lower than said first probability.

2. The optical fiber of claim 1 wherein said nonlinear optical effect is four-wave mixing.

3. The optical fiber of claim 1 wherein said core is formed of $SiO_2$.

4. The optical fiber of claim 3 wherein said dopant is $P_2O_5$.

5. The optical fiber of claim 3 wherein said dopant is $GeO_2$.

6. The optical fiber of claim 1 further comprising an amount of at least one cladding dopant uniformly dispersed throughout the cladding such that, with said cladding dopant, said optical fiber provides a third probability of said light producing said nonlinear optical effect at said given power, wherein said third probability is lower than said second probability.

7. The optical fiber of claim 6 wherein said dopant is $B_2O_3$.

8. An optical fiber comprising:
   a core for guiding light of a specified range of wavelengths therethrough, said light traveling through said optical fiber with a given power and potentially producing a nonlinear optical effect at said given power;

a cladding formed around the core for substantially containing the light within the core, said core and cladding being configured such that using only said core and said cladding in said optical fiber provides a first probability of said light producing said nonlinear optical effect at said given power;

a predetermined amount of at least one dopant uniformly dispersed throughout the core such that, with said dopant, said optical fiber provides a second probability of said light producing said nonlinear optical effect at said given power, wherein said second probability is lower than said first probability; and an amount of at least one cladding dopant uniformly dispersed throughout the cladding such that, with said cladding dopant, said optical fiber provides a third probability of said light producing said nonlinear optical effect at said given power, wherein said third probability is lower than said second probability.

9. A method for reducing nonlinear optical effects in an optical fiber, said optical fiber including a core for guiding light of a specified range of wavelengths therethrough, each wavelength in said specified range of wavelengths traveling through said optical fiber with a given power and potentially producing a nonlinear optical effect at said given power, said optical fiber further including a cladding formed around the core for substantially containing the light within the core, said core and cladding being configured such that using only said core and said cladding in said optical fiber provides a first probability of said light producing said nonlinear optical effect at said given power, said method comprising:

dispersing a predetermined amount of at least one dopant uniformly dispersed throughout the core such that, with said dopant, said optical fiber provides a second probability of said light producing said nonlinear optical effect at said given power, wherein said second probability is lower than said first probability.

10. The method of claim 9 further comprising:

dispersing an amount of at least one cladding dopant uniformly throughout the cladding such that, with said cladding dopant, said optical fiber provides a third probability of said light producing said nonlinear optical effect at said given power, wherein said third probability is lower than said second probability.

11. The method of claim 9 wherein dispersing said predetermined amount of at least one dopant includes distributing said dopant in a particular way to reduce four-wave mixing in said light with respect to said given power in comparison to in said light transmitted through said optical fiber without distributing said dopant in said particular way.

12. The method of claim 9 wherein said light contains data, wherein said optical fiber produces a given value of bit error rate in said data, and wherein dispersing said predetermined amount of at least one dopant includes distributing said dopant in a particular way such that said optical fiber, after said dopant is distributed throughout the core, produces another value of bit error rate in said data which is lower than said given value of bit error rate.

13. The method of claim 9 wherein said light contains data, wherein said optical fiber introduces a given level of deterioration in said light, and thereby data, during transmission therethrough such that said light may travel for a given distance through said optical fiber before fidelity of said data is lost, and wherein dispersing said predetermined amount of at least one dopant includes distributing said dopant in a particular way such that said optical fiber, after said dopant is distributed throughout the core, introduces another, lower level of deterioration in said light, and thereby data, during transmission therethrough such that said light may travel for another distance through said optical fiber before fidelity of said data is lost, said another distance being longer than said given distance.

14. The method of claim 9 wherein dispersing said predetermined amount of at least one dopant includes distributing said dopant in a particular way such that said optical fiber, after said dopant is distributed throughout the core, provides said first probability of said light producing said nonlinear optical effect at another power, said another power being higher than said given power.

15. A method for reducing nonlinear optical effects in an optical fiber, said optical fiber including a core for guiding light of a specified range of wavelengths therethrough, each wavelength in said specified range of wavelengths traveling through said optical fiber with a given power and potentially producing a nonlinear optical effect at said given power, said optical fiber further including a cladding formed around the core for substantially containing the light within the core, said core and cladding being configured such that using only said core and said cladding in said optical fiber provides a first probability of said light producing said nonlinear optical effect at said given power, said method comprising:

dispersing a predetermined amount of at least one dopant uniformly dispersed throughout the core such that, with said dopant, said optical fiber provides a second probability of said light producing said nonlinear optical effect at said given power, wherein said second probability is lower than said first probability; and dispersing an amount of at least one cladding dopant uniformly throughout the cladding such that, with said cladding dopant, said optical fiber provides a third probability of said light producing said nonlinear optical effect at said given power, wherein said third probability is lower than said second probability.

16. An optical fiber comprising:

a core for guiding light pulses of a specified range of wavelengths therethrough, said light pulses traveling through said optical fiber with a given power;

a cladding formed around the core for substantially containing the light pulses within the core, said core and cladding being configured such that using only said core and said cladding in said optical fiber provides a first bit error rate in transmission of said light pulses through said optical fiber at said given power; and a predetermined amount of at least one dopant uniformly dispersed throughout the core such that, with said dopant, said optical fiber provides a second bit error rate in transmission of said light pulses through said optical fiber at said given power, wherein said second bit error rate is lower than said first bit error rate.

17. The optical fiber of claim 16 wherein said cladding includes an amount of at least one cladding dopant uniformly dispersed throughout the cladding such that, with said cladding dopant, said optical fiber provides a third bit error rate in transmission of said light pulses through said optical fiber at said given power, wherein said third bit error rate is lower than said second bit error rate.

18. An optical fiber for use in a system for transmitting light pulses of a specified range of wavelengths with a given power therethrough, said light pulses containing data, said system including a plurality of repeaters, each one of said plurality of repeaters being configured for regenerating said light pulses, and thereby said data, received thereon, and each pair of said plurality of repeaters being spaced apart and connected by said optical fiber, said optical fiber comprising:

a core for guiding said light pulses;

a cladding formed around the core for substantially containing the light pulses within the core, said core and cladding being configured such that using only said core and said cladding in said optical fiber provides a first level of deterioration of said light pulses during transmission through said optical fiber at said given power such that each pair of said plurality of repeaters must be spaced apart by a first distance in order to timely regenerate said light pulses, thus preserving fidelity of said data; and a predetermined amount of at least one dopant uniformly dispersed throughout the core such that, with said dopant, said optical fiber provides a second level of deterioration in said light pulses during transmission through said optical fiber at said given power such that each pair of said plurality of repeaters may be spaced apart by a second distance in order to preserve fidelity of said data, wherein said second distance is longer than said first distance.

19. The optical fiber of claim 18 further comprising an amount of at least one cladding dopant uniformly dispersed throughout the cladding such that, with said cladding dopant, said optical fiber provides a third level of deterioration in said light pulses during transmission through said optical fiber at said given power such that each pair of said plurality of repeaters may be spaced apart by a third distance in order to preserve fidelity of said data, wherein said third distance is longer than said second distance.

20. An optical fiber for use in a system for transmitting light pulses of a specified range of wavelengths with a given power therethrough, said light pulses containing data, said system including a plurality of amplifiers, each one of said plurality of amplifiers being configured for amplifying said light pulses received thereon, and each pair of said plurality of amplifiers being spaced apart and connected by said optical fiber, said optical fiber comprising:

a core for guiding said light pulses;

a cladding formed around the core for substantially containing the light pulses within the core, said core and cladding being configured such that using only said core and said cladding in said optical fiber provides a first level of deterioration of said light pulses during transmission through said optical fiber at said given power such that each pair of said plurality of amplifiers must be spaced apart by a first distance in order to timely amplify said light pulses, thus preserving fidelity of said data; and a predetermined amount of at least one dopant uniformly dispersed throughout the core such that, with said dopant, said optical fiber provides a second level of deterioration in said light pulses during transmission through said optical fiber at said given power such that each pair of said plurality of amplifiers may be spaced apart by a second distance in order to preserve fidelity of said data, wherein said second distance is longer than said first distance.

21. The optical fiber of claim 20 further comprising an amount of at least one cladding dopant uniformly dispersed throughout the cladding such that, with said cladding dopant, said optical fiber provides a third level of deterioration in said light pulses during transmission through said optical fiber at said given power such that each pair of said plurality of amplifiers may be spaced apart by a third distance in order to preserve fidelity of said data, wherein said third distance is longer than said second distance.

* * * * *